(12) United States Patent
Hung et al.

(10) Patent No.: US 7,830,348 B2
(45) Date of Patent: Nov. 9, 2010

(54) INTEGRATED CIRCUIT FOR LIQUID CRYSTAL DISPLAY DEVICE

(75) Inventors: Chi-Mao Hung, Hsinchu (TW); Chien-Hung Chen, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 1284 days.

(21) Appl. No.: 10/865,941

(22) Filed: Jun. 14, 2004

(65) Prior Publication Data

US 2005/0128174 A1 Jun. 16, 2005

Related U.S. Application Data

(60) Provisional application No. 60/528,474, filed on Dec. 11, 2003.

(51) Int. Cl.
 *G09G 3/36* (2006.01)
(52) U.S. Cl. ........................................................ 345/98
(58) Field of Classification Search ............ 345/87–100
 See application file for complete search history.

(56) References Cited

U.S. PATENT DOCUMENTS

| | | | | | |
|---|---|---|---|---|---|
| 5,859,626 | A | * | 1/1999 | Kawamura | 345/99 |
| 6,144,355 | A | * | 11/2000 | Murata et al. | 345/99 |
| 6,304,243 | B1 | * | 10/2001 | Kondo et al. | 345/100 |
| 6,384,867 | B1 | | 5/2002 | Seino et al. | |
| 6,469,699 | B2 | | 10/2002 | Yoshine | |
| 6,806,871 | B1 | * | 10/2004 | Yasue | 345/211 |
| 7,027,017 | B2 | * | 4/2006 | Yer | 345/87 |
| 7,193,677 | B2 | * | 3/2007 | Ino | 349/149 |
| 7,209,111 | B2 | * | 4/2007 | Kurokawa et al. | 345/99 |
| 2007/0176880 | A1 | | 8/2007 | Kurokawa et al. | |

FOREIGN PATENT DOCUMENTS

| | | |
|---|---|---|
| JP | 11-007268 | 1/1999 |
| JP | 11-007268 | 12/1999 |
| JP | 11-352461 | 12/1999 |
| JP | 2002-064373 | 2/2002 |
| JP | 2002-313925 | 10/2002 |
| JP | 2004-029540 | 1/2004 |

OTHER PUBLICATIONS

English language translation of abstract of JP2004-029540.
English language translation of abstract of JP11-007268.
Japan Patent Office, Office Action, Apr. 20, 2010, Japan.

* cited by examiner

*Primary Examiner*—Bipin Shalwala
*Assistant Examiner*—Steven E Holton
(74) *Attorney, Agent, or Firm*—WPAT, PC; Justin King

(57) ABSTRACT

A liquid crystal display device that comprises a panel, a timing controller for providing control signals to the panel, a video chip for receiving video signals and providing decoded video signals to the panel, a phase lock loop for providing a reference clock frequency, and a source driver for receiving the control signals and video signals to drive the panel, wherein the timing controller, the video chip and the phase lock loop are incorporated into the source driver in an integrated circuit.

11 Claims, 2 Drawing Sheets

INTEGRATED CIRCUIT FOR LIQUID CRYSTAL DISPLAY DEVICE

This application claims priority to U.S. Provisional Application Ser. No. 60/528,474 filed on Dec. 11, 2003, which is incorporated herein by reference.

FIELD OF THE INVENTION

This invention relates in general to a liquid crystal display ("LCD") device and, more particularly, to an integrated circuit for driving an LCD device.

BACKGROUND OF THE INVENTION

FIG. 1 is a schematic diagram of a conventional liquid crystal display ("LCD") device 10. LCD device 10 includes an LCD panel 12 and a drive system 14. LCD panel 12 further includes gate drivers 12-2 and source drivers 12-4. Drive system 14, formed on a flexible printed circuit ("FPC") 16 external to LCD panel 12, further includes a power circuit 14-1, a video chip 14-2, a timing generator 14-3, a phase lock loop ("PLL") 14-4, a VCOM circuit 14-5, a light emitting diode ("LED") driver 14-6, and a serial programmable interface ("SPI I/F") 14-7. Drive system 14 provides video signals R, G and B, control signals H and V and clock signals to LCD panel 12. LCD device 10 generally operates in a mixed-voltage environment, which may use different voltage levels of, for example, 15 volts (V), −10V and 5V. These different voltage levels generally are provided by external sources, which may be costly to manage. Furthermore, power circuit 14-1, video chip 14-2, timing generator 14-3, PLL 14-4, VCOM circuit 14-5, LED driver 14-6 and SPI I/F 14-7 are formed in separate integrated circuits, disadvantageously resulting in an undesirable increase of device size.

SUMMARY OF THE INVENTION

Accordingly, the present invention is directed to a liquid crystal display ("LCD") device that obviates one or more of the problems due to limitations and disadvantages of the related art.

To achieve these and other advantages, and in accordance with the purpose of the invention as embodied and broadly described, there is provided a liquid crystal display device that comprises a panel, a timing controller for providing control signals to the panel, a video chip for receiving video signals and providing decoded video signals to the panel, a phase lock loop for providing a reference clock frequency, and a source driver for receiving the control signals and video signals to drive the panel, wherein the timing controller, the video chip and the phase lock loop are incorporated into the source driver in an integrated circuit.

In one aspect, the liquid crystal display device comprises a single voltage source for providing power to the liquid crystal display device.

In another aspect, the liquid crystal display device comprises a power chip being incorporated into the integrated circuit.

Also in accordance with the present invention, there is provided a liquid crystal display device that comprises a panel, a drive system for driving the panel, a timing controller of the drive system for providing control signals to the panel, a video chip of the drive system for receiving video signals and providing decoded video signals to the panel, a phase lock loop of the drive system for providing a reference clock frequency, and a source driver of the drive system for receiving the control signals and video signals to drive the panel.

Still in accordance with the present invention, there is provided a liquid crystal display device that comprises a panel, a drive system for driving the panel, a single voltage source for providing power to the drive system, a synchronization separator of the drive system for separating synchronization signals, a timing controller of the drive system for providing control signals to the panel, a video chip of the drive system for receiving video signals and providing decoded video signals to the panel, a phase lock loop of the drive system for providing a reference clock frequency, and a source driver of the drive system for receiving the control signals and video signals to drive the panel, wherein the synchronization separator, the timing controller, the phase lock loop and the source driver are incorporated into an integrated circuit.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
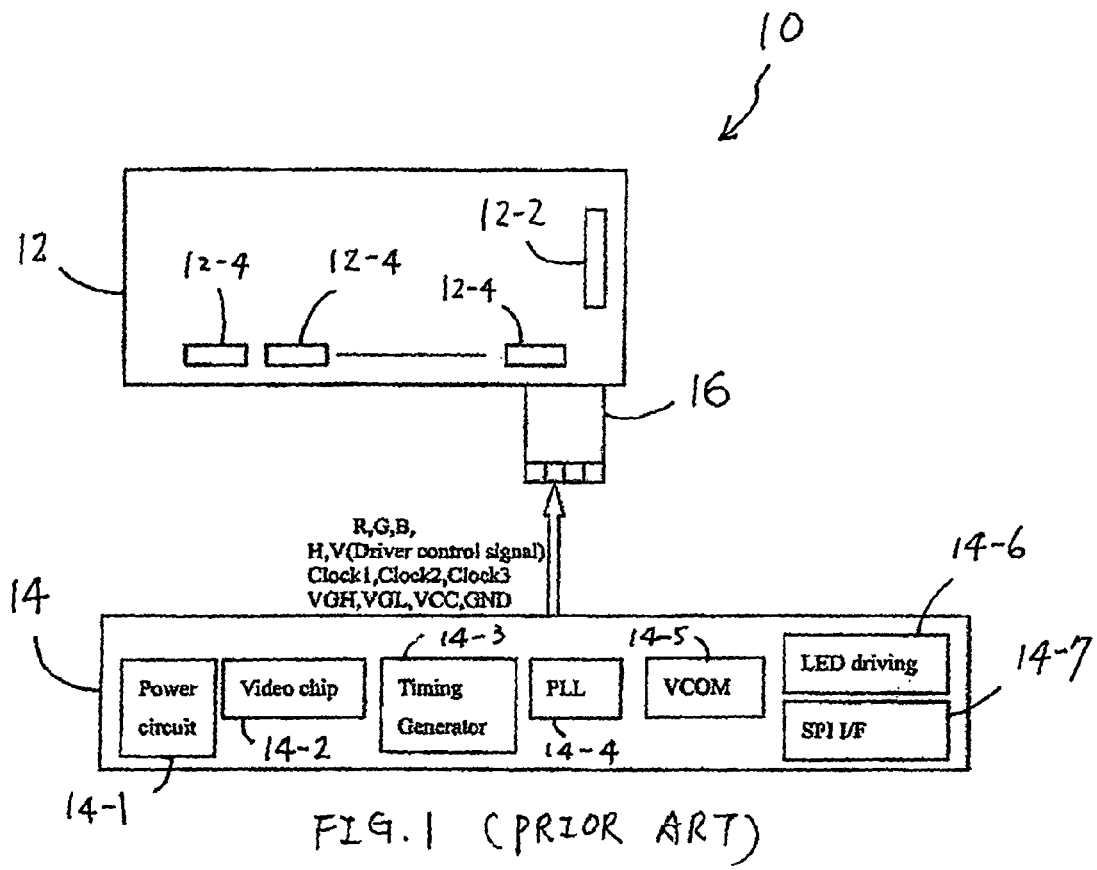
FIG. 1 is a schematic diagram of a conventional liquid crystal display ("LCD") device.
Figure 2:
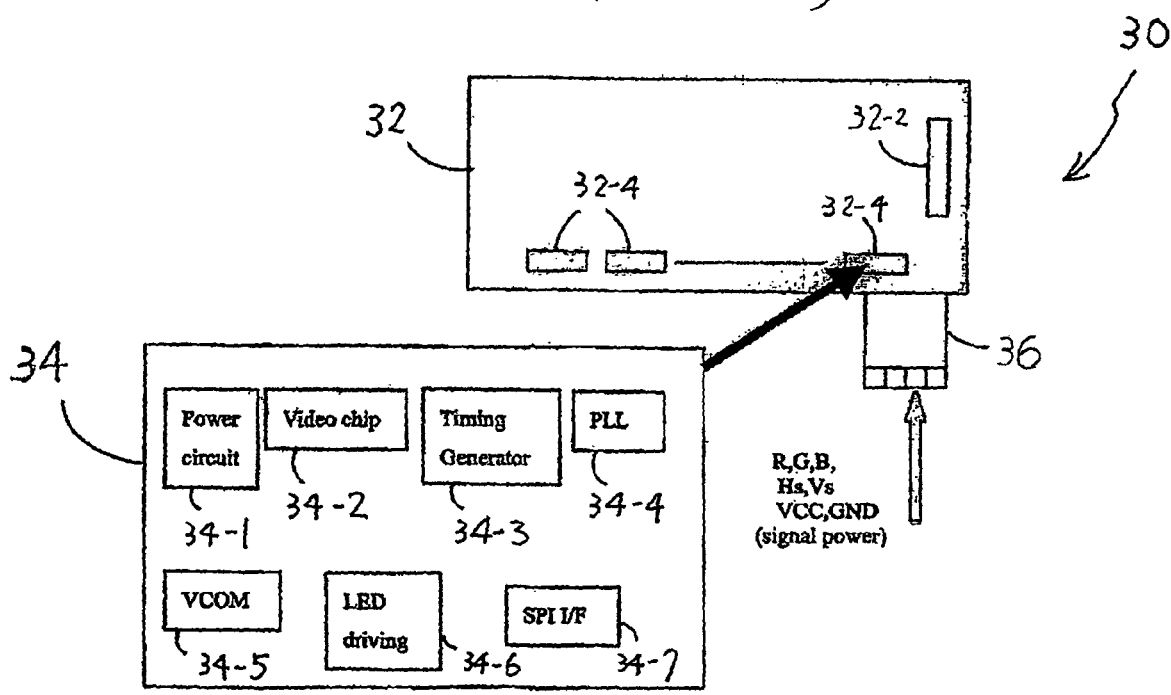
FIG. 2 is a schematic diagram of an LCD device in accordance with an embodiment of the present invention.

FIG. 2 is a schematic diagram of a liquid crystal display ("LCD") device 30 in accordance with an embodiment of the present invention. LCD device 30 includes an LCD panel 32, a drive system 34 and a flexible printed circuit ("FPC") 36. LCD panel 32 further includes gate drivers 32-2 and source drivers 32-4. Drive system 34 includes a power circuit 34-1, a video chip 34-2, a timing generator 34-3, a phase lock loop ("PLL") 34-4, a common voltage ("VCOM") circuit 34-5, a light emitting diode ("LED") driver 34-6 and a serial programmable interface ("SPI I/F") 34-7. FPC 36 provides analog R (red), G (green), B (blue) signals, synchronization signals Hs and Vs, and power signals such as VCC and GND.

In an embodiment according to the invention, video chip 34-2, timing generator 34-3 and PLL 34-4 are incorporated into at least one of source drivers 32-4 in an integrated circuit ("IC"). In another embodiment, at least one of power circuit 34-1, VCOM circuit 34-5, LED driver 34-6 and SPI I/F 34-7 is further incorporated into the IC. Drive system 34 may further include a synchronization separator (not shown). In still another embodiment, the synchronization separator is further incorporated into the IC.

Figure 3:
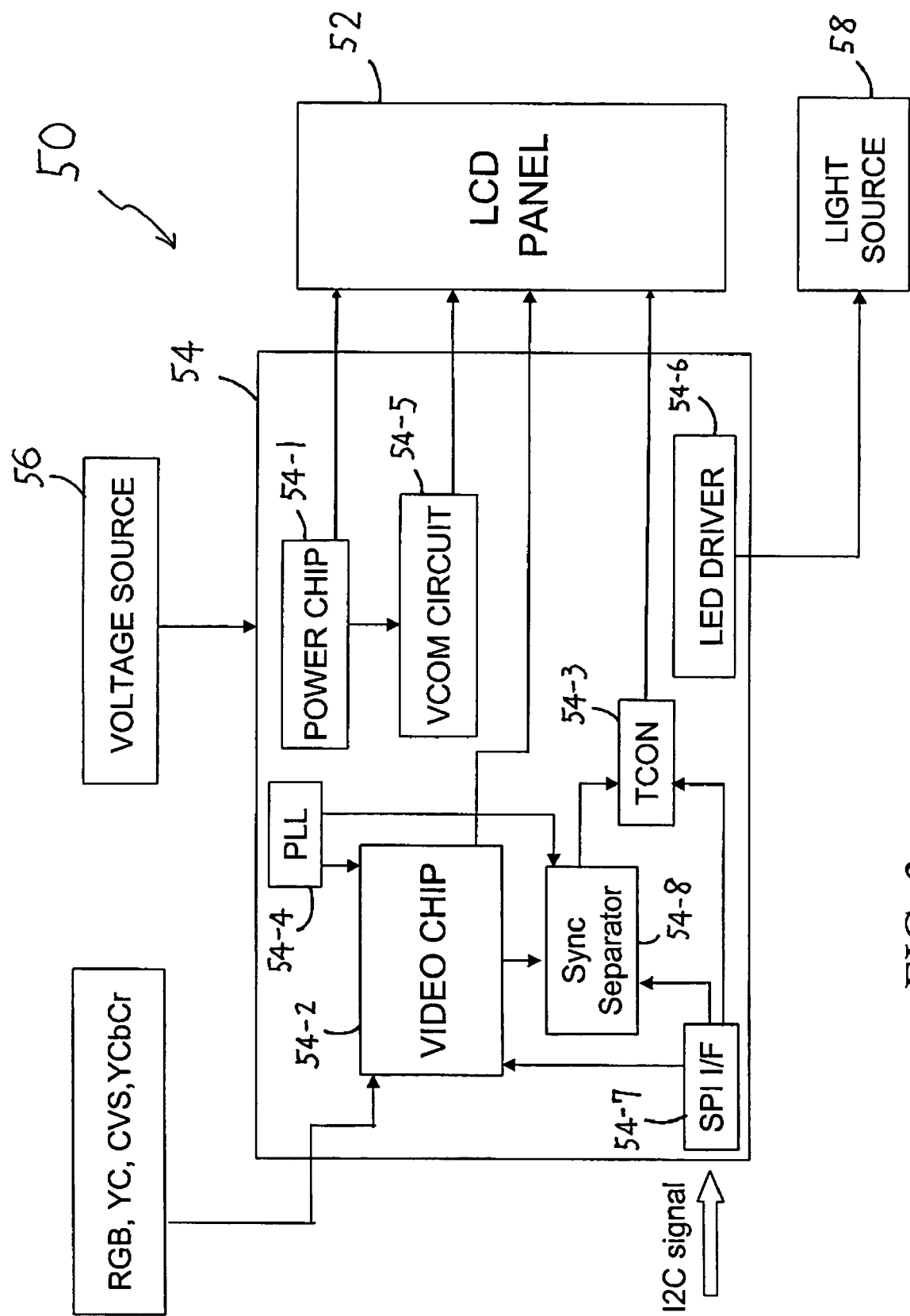
FIG. 3 is a block diagram of an LCD device in accordance with another embodiment of the present invention.

FIG. 3 is a block diagram of a liquid crystal display ("LCD") device 50 in accordance with another embodiment of the present invention. LCD device 50 includes an LCD panel 52, a drive circuit 54 and a voltage source 56. Drive circuit 54 further includes a power circuit 54-1, a video chip 54-2, a timing controller 54-3, a phase lock loop ("PLL") 54-4, a common voltage ("VCOM") circuit 54-5, a light emitting diode ("LED") driver 54-6, a serial programmable interface ("SPI IF") 54-7, and a synchronization separator 54-8. Voltage source 56 provides a voltage signal ranging from, for example, approximately 1.8V to 5V. Power circuit 54-1 such as a pulse width modulator ("PWM") receives the voltage signal from voltage source 56 and provides modulated voltage levels, for example, approximately 15V, 7.5V and −10V, to LCD panel 52.

Video chip 54-2 such as a video decoder receives video signals including analog R, G, B signals, luminance/chrominance ("YC") signals, composite video signals ("CVS"), and color signals YCbCr, and provides alternated R, G, B signals to panel 52. Timing controller 54-3 provides control signals to panel 52. PLL 54-4 provides a reference clock frequency to video chip 54-2 and synchronization separator 54-8. VCOM circuit 54-5 such as a VCOM amplifier provides a common voltage signal to panel 52 during, for example, periods of line inversion. LED driver 54-6 drives a light source 58 to illuminate panel 52. SPI I/F 54-7 such as an I2C bus interface receives I2C signals for setting operation frequency. Synchronization separator 54-8 separates horizontal synchronization signals from vertical synchronization signals.

In an embodiment according to the invention, video chip 54-2, timing controller 54-3 and PLL 54-4 are incorporated into at least one of source drivers (not shown) of LCD device 50 in an integrated circuit ("IC"). In another embodiment, at least one of power circuit 54-1, VCOM circuit 54-5, LED driver 54-6, SPI IF 54-7 and synchronization separator 54-8 is further incorporated into the IC. LCD device 50 therefore has advantageously simpler external circuits. Furthermore, the integration enables LCD device 50 to operate in a single voltage source, resulting in a decrease of power consumption and improved power management.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A liquid crystal display device comprising:
   a LCD panel;
   a serial programmable interface for receiving operation frequency setting;
   a synchronization separator coupled directly to said serial programmable interface and receiving said operating frequency setting from said serial programmable interface; and
   an integrated circuit comprising;
   a phase lock loop;
   a video chip coupled directly to said LCD panel, directly to said serial programmable interface, directly to said synchronization separator, and directly to said phase lock loop, wherein said video chip receives video signals from a video source, decodes said video signals, and sends decoded video signals to said LCD panel;
   a timing controller coupled directly to said serial programmable interface, said synchronization separator, and said LCD panel, wherein said timing controller receives operating frequency setting from said serial programmable interface, and generates timing control signal, provides said timing control signal to said LCD panel; and
   a light emitting diode driver.

2. The device of claim 1 comprising a single voltage source for providing power to the liquid crystal display device.

3. The device of claim 1 comprising a power chip being incorporated into the integrated circuit.

4. The device of claim 1 comprising a common voltage circuit being incorporated into the integrated circuit.

5. The device of claim 1, wherein said serial programmable interface is incorporated into the integrated circuit.

6. The device of claim 1, wherein said synchronization separator is incorporated into the integrated circuit.

7. A liquid crystal display device comprising:
   a LCD panel;
   a timing controller, coupled directly to said LCD panel, for providing control signals to the LCD panel;
   a phase lock loop of the drive system for providing a reference clock frequency;
   a video chip, coupled directly to said LCD panel and directly to said phase lock loop, for receiving video signals from a video source, decoding said video signal, and providing decoded video signals to the LCD panel; and
   a light emitting diode driver;
   wherein the timing controller, the video chip, the light emitting diode driver, the timing controller, and the phase lock loop are incorporated into an integrated circuit.

8. The device of claim 7 comprising a power chip being incorporated into an integrated circuit.

9. The device of claim 7 comprising a common voltage circuit being incorporated into an integrated circuit.

10. The device of claim 7 comprising a serial programmable interface being incorporated into an integrated circuit.

11. The device of claim 7 comprising a synchronization separator being incorporated into an integrated circuit.

* * * * *